US011299235B2

(12) United States Patent
Durrani (10) Patent No.: US 11,299,235 B2
(45) Date of Patent: Apr. 12, 2022

(54) FOOT AND HAND PEDALED BICYCLE ASSEMBLY

(71) Applicant: Imran Durrani, Ashburn, VA (US)

(72) Inventor: Imran Durrani, Ashburn, VA (US)

( * ) Notice: Subject to any disclaimer, the term of this patent is extended or adjusted under 35 U.S.C. 154(b) by 186 days.

(21) Appl. No.: 16/730,010

(22) Filed: Dec. 30, 2019

(65) Prior Publication Data

US 2021/0197922 A1    Jul. 1, 2021

(51) Int. Cl.
| | |
|---|---|
| *B62M 1/12* | (2006.01) |
| *B62K 3/04* | (2006.01) |
| *B62M 3/08* | (2006.01) |
| *B62K 21/12* | (2006.01) |
| *B62K 21/02* | (2006.01) |
| *B62K 17/00* | (2006.01) |
| *B62M 9/00* | (2006.01) |

(52) U.S. Cl.
CPC ............... *B62M 1/12* (2013.01); *B62K 3/04* (2013.01); *B62K 17/00* (2013.01); *B62K 21/02* (2013.01); *B62K 21/12* (2013.01); *B62M 3/08* (2013.01); *B62M 9/00* (2013.01)

(58) Field of Classification Search
CPC . B62M 1/12; B62M 3/08; B62M 9/00; B62M 3/00; B62K 3/04; B62K 21/12; B62K 21/02; B62K 17/00; B62K 19/18; A63B 2069/165; A63B 2069/163; B62H 7/00; B62H 3/10
See application file for complete search history.

(56) References Cited

U.S. PATENT DOCUMENTS

| | | | |
|---|---|---|---|
| 3,193,305 A * | 7/1965 | Hendricks | B62M 23/00 280/225 |
| D277,744 S | 2/1985 | Traylor | |
| 4,548,420 A * | 10/1985 | Patroni, Jr. | B62M 1/16 280/224 |
| 4,685,692 A * | 8/1987 | Fullilove | B62M 1/12 280/234 |
| 5,022,671 A * | 6/1991 | Jones, Jr. | B62K 3/005 280/250 |
| 5,039,122 A * | 8/1991 | Deutch | B62M 1/12 280/234 |
| 5,908,199 A * | 6/1999 | Rigato | B62M 1/12 280/233 |
| 6,099,009 A * | 8/2000 | Schroeder | B62M 23/00 280/234 |

(Continued)

FOREIGN PATENT DOCUMENTS

WO    WO2008143541    11/2008

*Primary Examiner* — Tony H Winner
*Assistant Examiner* — Marlon A Arce (57) ABSTRACT

A foot and hand pedaled bicycle assembly that facilitates a full body working during riding includes a bicycle that has a front wheel, a rear wheel and a frame. The frame has a top member and a lower member that each pivotally extends between a seat post and a handlebar fork. The handlebar fork is urgeable toward or away from the seat post. A pair of pedals is provided and each of the pedals is rotatably coupled to the frame for rotating the rear wheel. A pair of hand cranks is provided and each of the hand cranks is coupled to the handlebar fork for steering the bicycle. Moreover, each of the hand cranks is in mechanical communication with the front wheel for rotating the front wheel when the hand cranks are cranked.

9 Claims, 6 Drawing Sheets

(56) References Cited

U.S. PATENT DOCUMENTS

| | | | |
|---|---|---|---|
| 6,264,224 B1* | 7/2001 | Phillips | B62M 23/00 280/234 |
| 7,413,206 B2* | 8/2008 | Pena | B62M 1/16 280/233 |
| 7,416,203 B2 | 8/2008 | Tollhurst | |
| 8,430,797 B2 | 4/2013 | Wan | |
| 8,876,135 B2* | 11/2014 | Kim | B62M 17/00 280/234 |
| 8,939,457 B2* | 1/2015 | Poor | B62M 1/16 280/233 |
| 9,073,600 B2* | 7/2015 | Haan | B62M 1/12 |
| 9,381,396 B2 | 7/2016 | Colan | |
| 10,328,992 B2* | 6/2019 | Laxstrom | B62K 19/24 |
| 2008/0290628 A1 | 11/2008 | Tulpan | |
| 2010/0059963 A1 | 3/2010 | Liao | |
| 2014/0239611 A1* | 8/2014 | Hon | B62K 15/008 280/287 |
| 2017/0210439 A1* | 7/2017 | Schwaiger | B62K 19/18 |

\* cited by examiner

FOOT AND HAND PEDALED BICYCLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to bicycle devices and more particularly pertains to a new bicycle device that facilitates a full body work out during riding.

BRIEF SUMMARY OF THE INVENTION

An embodiment of the disclosure meets the needs presented above by generally comprising a bicycle that has a front wheel, a rear wheel and a frame. The frame has a top member and a lower member that each pivotally extends between a seat post and a handlebar fork. The handlebar fork is urgeable toward or away from the seat post.
A pair of pedals is provided and each of the pedals is rotatably coupled to the frame for rotating the rear wheel. A pair of hand cranks is provided and each of the hand cranks is coupled to the handlebar fork for steering the bicycle. Moreover, each of the hand cranks is in mechanical communication with the front wheel for rotating the front wheel when the hand cranks are cranked.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
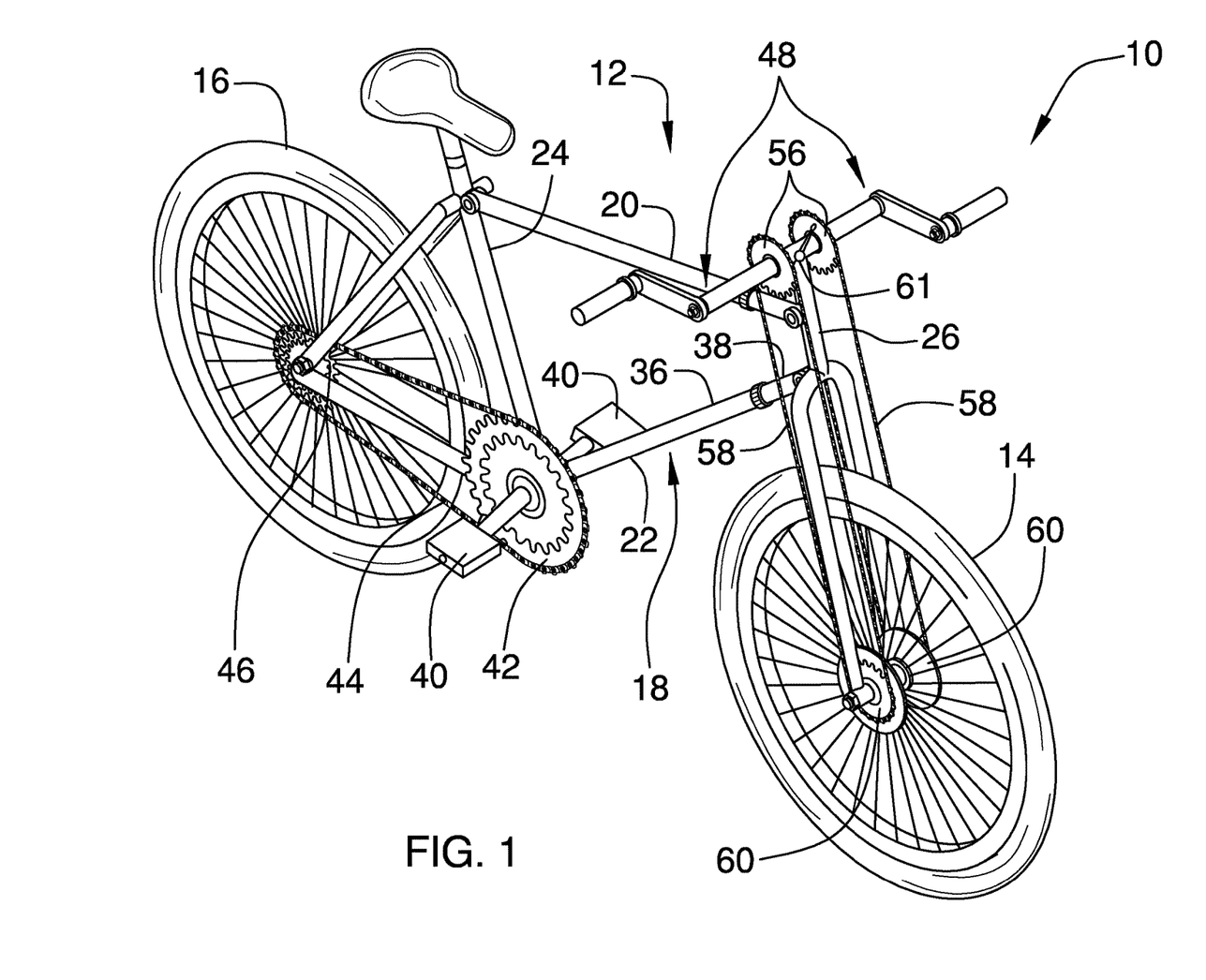
FIG. 1 is a perspective view of a foot and hand pedaled bicycle assembly according to an embodiment of the disclosure.
Figure 2:
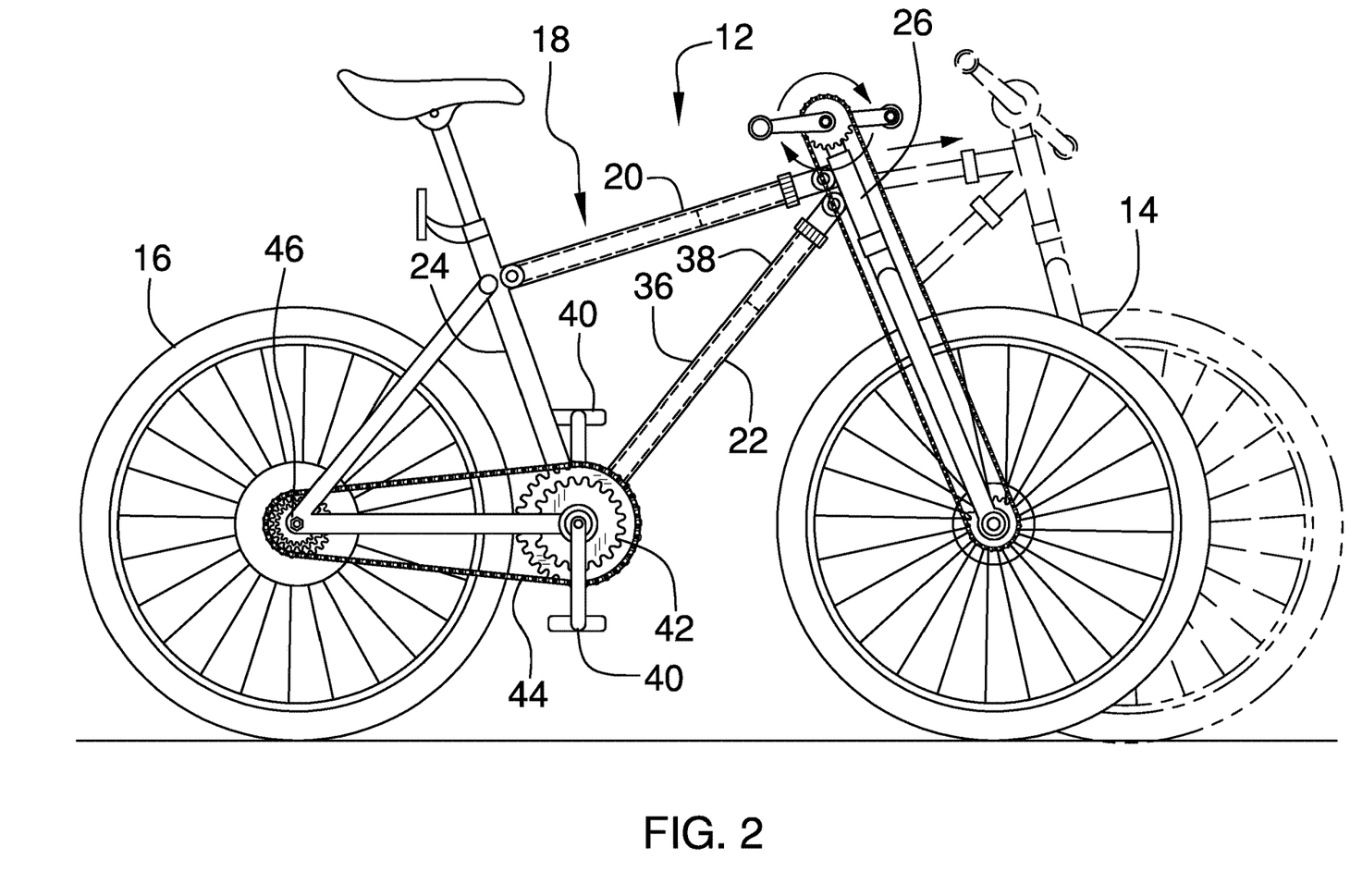
FIG. 2 is a right side view of an embodiment of the disclosure.
Figure 3:
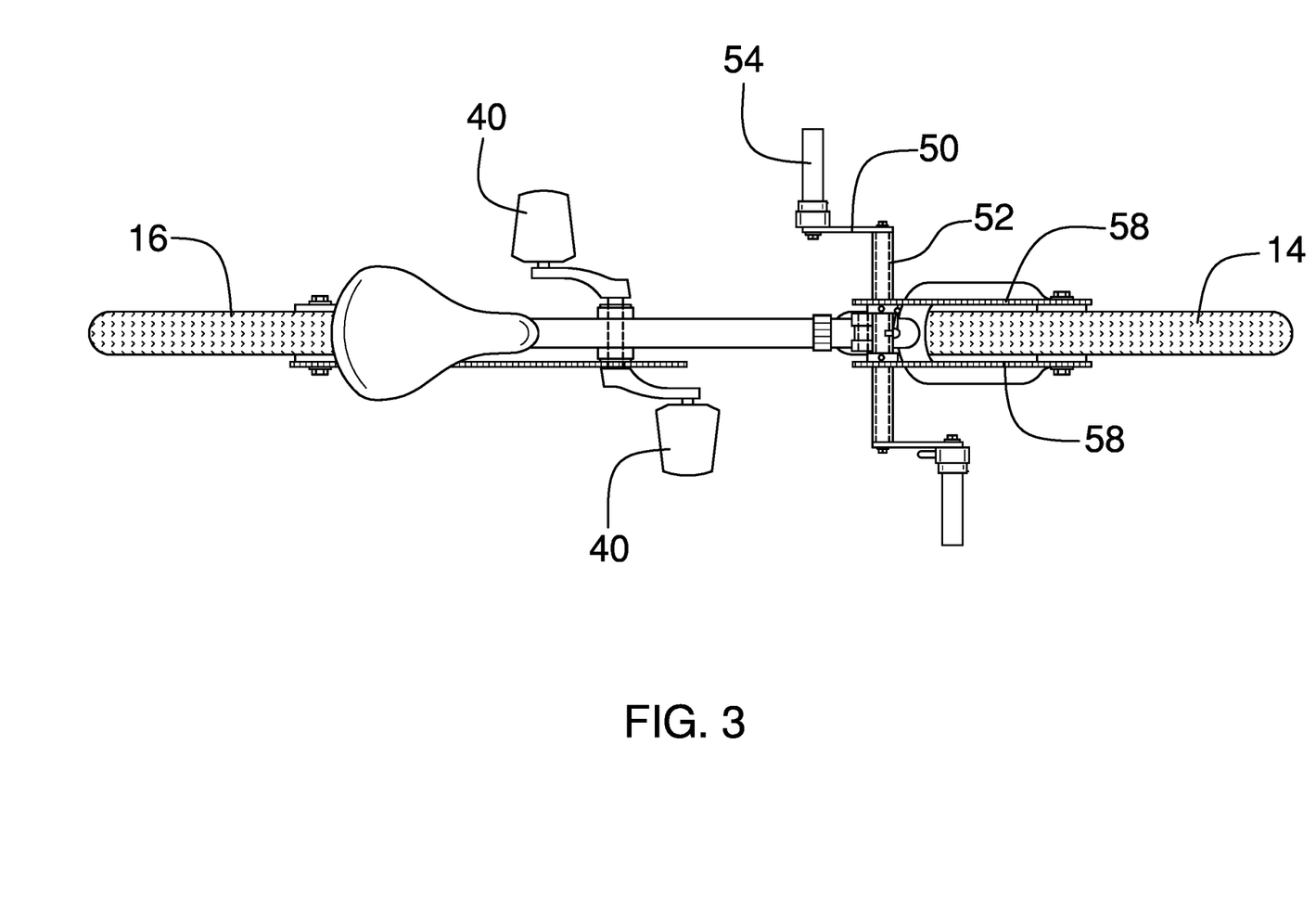
FIG. 3 is a top view of an embodiment of the disclosure.
Figure 4:
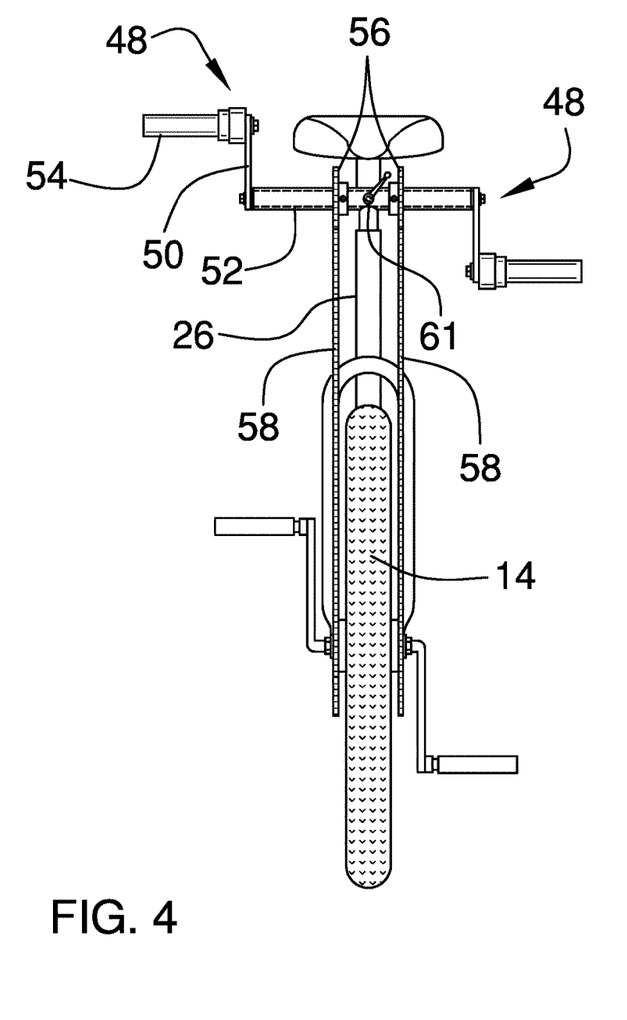
FIG. 4 is a front view of an embodiment of the disclosure.
Figure 5:
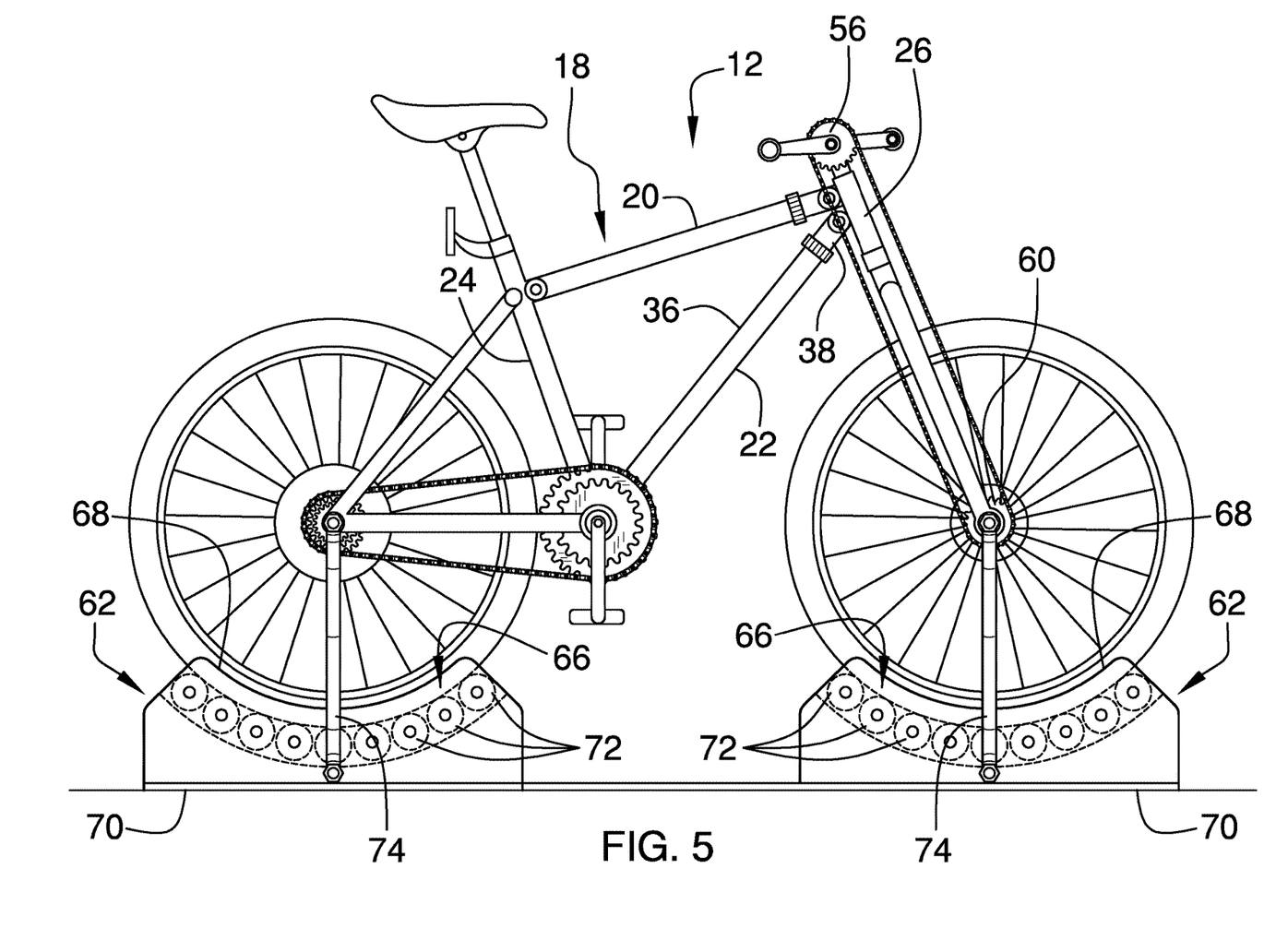
FIG. 5 is a right side in-use view of an embodiment of the disclosure.
Figure 6:
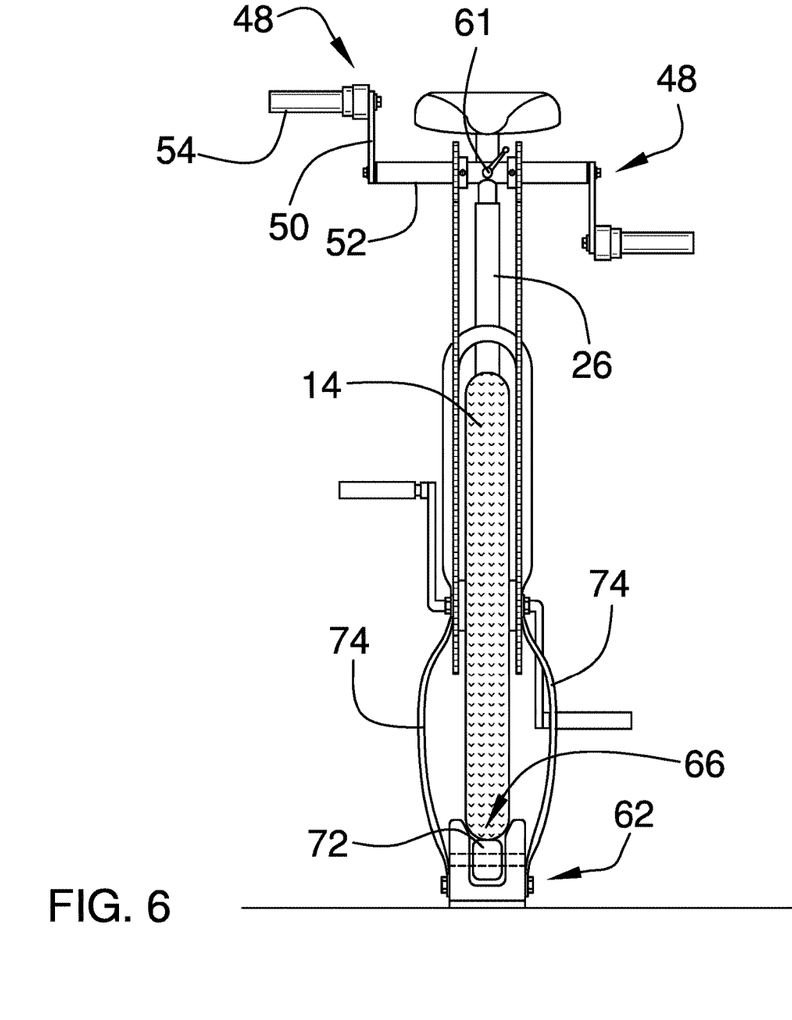
FIG. 6 is a front in-use view of an embodiment of the disclosure.

With reference now to the drawings, and in particular to FIGS. 1 through 6 thereof, a new bicycle device embodying the principles and concepts of an embodiment of the disclosure and generally designated by the reference numeral 10 will be described.

As best illustrated in FIGS. 1 through 6, the foot and hand pedaled bicycle assembly 10 generally comprises a bicycle 12 has a front wheel 14, a rear wheel 16 and a frame 18. The frame 18 has a top member 20 and a lower member 22 that each pivotally extends between a seat post 24 and a handlebar fork 26. Each of the top member 20 and the lower member 22 has a first end 28 and a second end 30. The first end 28 of each of the top member 20 and the lower member 22 is pivotally coupled to the seat post 24.

The top member 20 is positioned adjacent to a top end 32 of the seat post 24 and the lower member 22 is positioned adjacent to a bottom end 34 of the seat post 24. The second end 30 of each of the top member 20 and the lower member 22 is pivotally coupled to the handlebar fork 26. In this way the seat post 24, the top member 20 and the lower member 22 define a generally triangular shape having the seat post 24 defining a base of the triangular shape. Each of the top member 20 and the lower member 22 has a first portion 36 that slidably receives a second portion 38. Thus, each of the top member 20 and the lower member 22 has a telescopically adjustable length thereby facilitating the handlebar fork 26 to be urgeable toward or away from the seat post 24.

A pair of pedals 40 is provided, each of the pedals 40 is rotatably coupled to the frame 18 and the pair of pedals 40 includes a pedal gear 42. A first chain 44 is coupled around the pedals 40 and the rear wheel 16 for rotating the rear wheel 16 when the pedals 40 are pedaled by a rider. The first chain 44 extends around the pedal gear 42 and a sprocket 46 on the rear wheel 16.

A pair of hand cranks 48 is provided and each of the hand cranks 48 is rotatably coupled to handlebar fork 26. The hand cranks 48 rotate the handlebar fork 26 about a vertical axis when the hand cranks 48 are turned left or right for steering the bicycle 12. Each of the hand cranks 48 has a central portion 50 pivotally extending between a first portion 52 and a second portion 54. The first portion 52 of each of the hand cranks 48 is rotatably coupled to the handlebar fork 26 having the first portion 52 of each of the hand cranks 48 extending along a perpendicular axis with respect to the vertical axis of the handlebar fork 26.

The second portion 54 of each of the hand cranks 48 is directed away from the handlebar fork 26. Moreover, the second portion 54 of each of the hand cranks 48 is gripped by the rider for steering the bicycle 12. The first portion 52 of each of the hand cranks 48 is rotatable about the perpendicular axis when the hand cranks 48 are cranked by the rider. A pair of crank gears 56 is each coupled to a receptive one of the hand cranks 48. Thus, each of the crank gears 56 is rotated when the hand cranks 48 are cranked and each of the crank gears 56 is positioned on the first portion 36 of the respective hand crank 48.

A pair of second chains 58 is each coupled around the hand cranks 48 and the front wheel 14 for rotating the front wheel 14 when the hand cranks 48 are cranked. Each of the second chains 58 extends around a respective one of the cranks gears 56 and a respective one of a pair of sprockets 60 on the front wheel 14. A locking mechanism 61 is movably coupled to the handlebar fork 26 and the locking mechanism 61 releasably engages each of the hand cranks 48. Each of the hand cranks 48 is inhibited from being cranked when the locking mechanism 61 is engaged. In this way the hand cranks 48 can be used only to steer the bicycle 12. Each of the hand cranks 48 is facilitated to be cranked when the locking mechanism 61 is disengaged. The locking mechanism 61 may include, but not be limited to, a lever coupled to a clamp for squeezing the hand cranks 48, a plate that frictionally engages the hand cranks 12 or any other type of mechanical lock.

A pair of roller units 62 is provided and each of the roller units 62 is positionable on a support surface 64, such as the ground, a floor or any other vertical support surface. Each of the roller units 62 has a wheel slot 66 therein and the wheel slot 66 in each of the roller units 62 insertably receives a respective one of the front wheel 14 or the rear wheel 16 of the bicycle 12. In this way the bicycle 12 can remain stationary when the bicycle 12 is ridden. Each of the roller units 62 has a top side 68 and a bottom side 70, and the wheel slot 66 in each of the roller units 62 extends downwardly into the top side 68. Additionally, each of the roller units 62 includes a plurality of rollers 72 that is each rotatably positioned within a respective one of the roller units 62. Each of the rollers 72 in each of the roller units 62 facilitates the front wheel 14 and the rear wheel 16 to rotate.

A plurality of supports 74 is provided and each of the supports 74 is removably coupled between the bicycle 12 and a respective one of the roller units 62 when the bicycle 12 is positioned in the roller units 62. Each of the supports 74 retains the bicycle 12 in an upright position. Each of the supports 74 extends upwardly from the top side 68 of the respective roller unit 62. Additionally, each of the supports 74 engages an axle of a respective one of the front wheel 14 or the rear wheel 16 when the bicycle 12 is positioned in the respective roller unit 62.

In use, each of the pedals 40 and each of the hand cranks 48 are rotated when the bicycle 12 is being ridden. In this way the rider's legs and the rider's arms are exercised when the bicycle 12 is being ridden. The handlebar fork 26 can be urged away from the seat post 24 when the bicycle 12 is being ridden. In this way the rider can be positioned in a "plank" position for exercising the rider's core muscles when the bicycle 12 is being ridden. Thus, the rider can experience a full body workout when the bicycle 12 is being ridden.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A foot and hand pedaled bicycle assembly being configured to be pedaled with a user's feet and a user's hands for a full body exercise, said assembly comprising:
   a bicycle having a front wheel, a rear wheel and a frame, said frame having a top member and a lower member each pivotally extending between a seat post and a handlebar fork, said handlebar fork being urgeable toward or away from said seat post;
   a pair of pedals, each of said pedals being rotatably coupled to said frame;
   a first chain being coupled around said pedals and said rear wheel for rotating said rear wheel when said pedals are pedaled by a rider;
   a pair of hand cranks, each of said hand cranks being rotatably coupled to handlebar fork steering said bicycle;
   a pair of crank gears, each of said crank gears being coupled to a receptive one of said hand cranks such that each of said crank gears is rotated when said hand cranks are cranked;
   a pair of second chains, each of said second chains being coupled around said hand cranks and said front wheel for rotating said front when said hand cranks are cranked;
   a pair of roller units, each of said rollers units being positionable on a support surface, each of said roller units having a wheel slot therein, said wheel slot in each of said roller units insertably receiving a respective one of said front wheel or said rear wheel of said bicycle wherein said bicycle is configured to remain stationary when said bicycle is ridden; and
   wherein each of said roller units has a top side and a bottom side, said wheel slot in each of said roller units extending downwardly into said top side, each of said roller units including a plurality of rollers each being rotatably positioned within a respective one of said roller units thereby facilitating said front wheel and said rear wheel to rotate.

2. The assembly according to claim 1, wherein each of said top member and said lower member has a first end and a second end, said first end of each of said top member and said lower member being pivotally coupled to said seat post, said top member being positioned adjacent to an top end of said seat post, said lower member being positioned adjacent to a bottom end of said seat post, said second end of each of said top member and said lower member being pivotally coupled to said handlebar fork.

3. A foot and hand pedaled bicycle assembly being configured to be pedaled with a user's feet and a user's hands for a full body exercise, said assembly comprising:
   a bicycle having a front wheel, a rear wheel and a frame, said frame having a top member and a lower member each pivotally extending between a seat post and a handlebar fork, said handlebar fork being urgeable toward or away from said seat post;
   a pair of pedals, each of said pedals being rotatably coupled to said frame;
   a first chain being coupled around said pedals and said rear wheel for rotating said rear wheel when said pedals are pedaled by a rider;
   a pair of hand cranks, each of said hand cranks being rotatably coupled to handlebar fork steering said bicycle;
   a pair of crank gears, each of said crank gears being coupled to a receptive one of said hand cranks such that each of said crank gears is rotated when said hand cranks are cranked;
   a pair of second chains, each of said second chains being coupled around said hand cranks and said front wheel for rotating said front when said hand cranks are cranked;
   a pair of roller units, each of said rollers units being positionable on a support surface, each of said roller units having a wheel slot therein, said wheel slot in each of said roller units insertably receiving a respective one of said front wheel or said rear wheel of said bicycle wherein said bicycle is configured to remain stationary when said bicycle is ridden;
   wherein each of said top member and said lower member has a first end and a second end, said first end of each of said top member and said lower member being pivotally coupled to said seat post, said top member being positioned adjacent to an top end of said seat post, said lower member being positioned adjacent to a bottom end of said seat post, said second end of each of said top member and said lower member being pivotally coupled to said handlebar fork; and
   wherein said seat post, said top member and said lower member defines a generally triangular shape having said seat post defining a base of said triangular shape, each of said top member and said lower member having a first portion slidably receiving a second portion such that each of said top member and said lower member has a telescopically adjustable length.

4. The assembly according to claim 3, wherein:
   said pair of pedals includes a pedal gear;
   said first chain extends around said pedal gear and a sprocket on said rear wheel.

5. The assembly according to claim 1, wherein each of said hand cranks has a central portion pivotally extending between a first portion and a second portion, said first portion of each of said hand cranks being rotatably coupled to said handlebar fork having said first portion of each of said hand cranks extending along a perpendicular axis with respect to said vertical axis of said handlebar fork.

6. A foot and hand pedaled bicycle assembly being configured to be pedaled with a user's feet and a user's hands for a full body exercise, said assembly comprising:
   a bicycle having a front wheel, a rear wheel and a frame, said frame having a top member and a lower member each pivotally extending between a seat post and a handlebar fork, said handlebar fork being urgeable toward or away from said seat post;
   a pair of pedals, each of said pedals being rotatably coupled to said frame;
   a first chain being coupled around said pedals and said rear wheel for rotating said rear wheel when said pedals are pedaled by a rider;
   a pair of hand cranks, each of said hand cranks being rotatably coupled to handlebar fork steering said bicycle;
   a pair of crank gears, each of said crank gears being coupled to a receptive one of said hand cranks such that each of said crank gears is rotated when said hand cranks are cranked;
   a pair of second chains, each of said second chains being coupled around said hand cranks and said front wheel for rotating said front when said hand cranks are cranked;
   a pair of roller units, each of said rollers units being positionable on a support surface, each of said roller units having a wheel slot therein, said wheel slot in each of said roller units insertably receiving a respective one of said front wheel or said rear wheel of said bicycle wherein said bicycle is configured to remain stationary when said bicycle is ridden;
   wherein each of said hand cranks has a central portion pivotally extending between a first portion and a second portion, said first portion of each of said hand cranks being rotatably coupled to said handlebar fork having said first portion of each of said hand cranks extending along a perpendicular axis with respect to said vertical axis of said handlebar fork; and
   wherein said second portion of each of said hand cranks is directed away from said handlebar fork wherein said second portion of each of said hand cranks is configured to be gripped by the rider for steering said bicycle, said first portion of each of said hand cranks being rotatable about said perpendicular axis when said hand cranks are cranked by the rider.

7. The assembly according to claim 6, wherein:
   said hand cranks rotate said handlebar fork about a vertical axis when said hand cranks are turned left or right for steering;
   each of said crank gears is positioned on said first portion of said respective hand crank; and
   each of said second chains extends around a respective one of said cranks gears and a respective one of a pair of sprockets on said front wheel.

8. The assembly according to claim 1, further comprising a plurality of supports, each of said supports being removably coupled between said bicycle and a respective one of said roller units when said bicycle is positioned in said roller units, each of said supports retaining said bicycle in an upright position, each of said supports extending upwardly from said top side of said respective roller unit, each of said supports engaging an axle of a respective one of said front wheel or said rear wheel when said bicycle is positioned in said roller unit.

9. The assembly according to claim 1, further comprising:
   each of said top member and said lower member having a first end and a second end, said first end of each of said top member and said lower member being pivotally coupled to said seat post, said top member being positioned adjacent to an top end of said seat post, said lower member being positioned adjacent to a bottom end of said seat post, said second end of each of said top member and said lower member being pivotally coupled to said handlebar fork, wherein said seat post, said top member and said lower member define a generally triangular shape having said seat post defining a base of said triangular shape, each of said top member and said lower member having a first portion slidably receiving a second portion such that each of said top member and said lower member has a telescopically adjustable length thereby facilitating said handlebar fork to be urgeable toward or away from said seat post;

said pair of pedals including a pedal gear;

said first chain extending around said pedal gear and a sprocket on said rear wheel;

said hand cranks rotating said handlebar fork about a vertical axis when said hand cranks are turned left or right for steering said bicycle, each of said hand cranks having a central portion pivotally extending between a first portion and a second portion, said first portion of each of said hand cranks being rotatably coupled to said handlebar fork having said first portion of each of said hand cranks extending along a perpendicular axis with respect to said vertical axis of said handlebar fork, said second portion of each of said hand cranks being directed away from said handlebar fork wherein said second portion of each of said hand cranks is configured to be gripped by the rider for steering said bicycle, said first portion of each of said hand cranks being rotatable about said perpendicular axis when said hand cranks are cranked by the rider;

each of said crank gears being positioned on said first portion of said respective hand crank;

each of said second chains extending around a respective one of said cranks gears and a respective one of a pair of sprockets on said front wheel;

and a plurality of supports, each of said supports being removably coupled between said bicycle and a respective one of said roller units when said bicycle is positioned in said roller units, each of said supports retaining said bicycle in an upright position, each of said supports extending upwardly from said top side of said respective roller unit, each of said supports engaging an axle of a respective one of said front wheel or said rear wheel when said bicycle is positioned in said roller unit.

* * * * *